Oct. 15, 1940.  S. M. ROWE  2,217,820
FISHING APPARATUS
Filed April 21, 1939
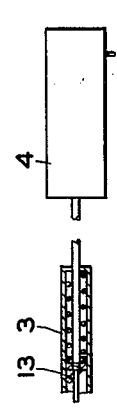
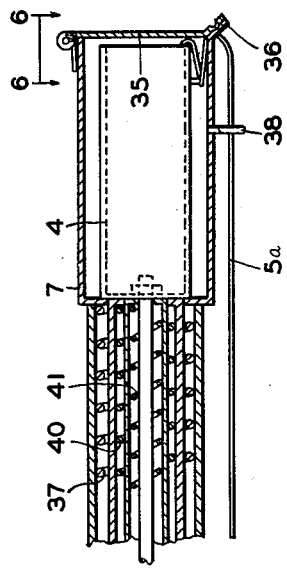
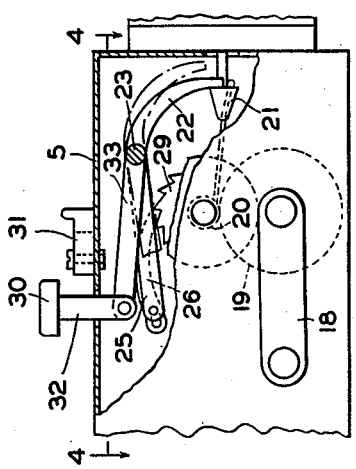
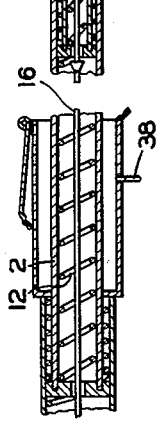
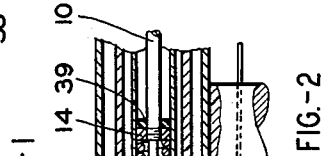
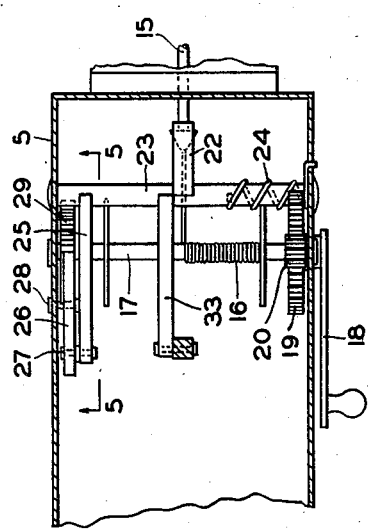
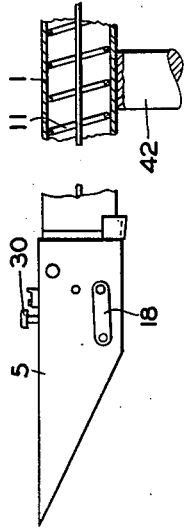
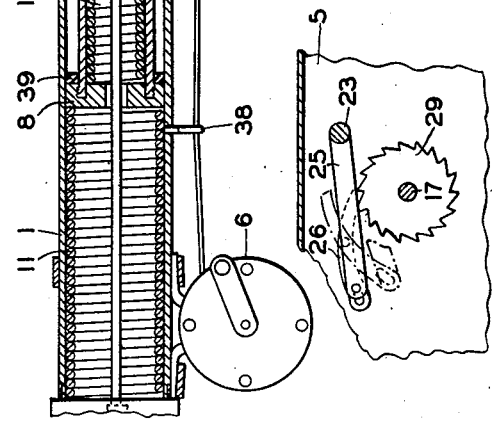
INVENTOR
SIDNEY M. ROWE
BY John Mahoney
ATTORNEY Patented Oct. 15, 1940

2,217,820

UNITED STATES PATENT OFFICE 2,217,820

FISHING APPARATUS

Sidney M. Rowe, Montgomery, Ala., assignor of forty per cent to Floyd H. Mooneyham, Montgomery, Ala.

Application April 21, 1939, Serial No. 269,223

10 Claims. (Cl. 43—19)

My invention relates to fishing apparatus and more particularly to bait casting apparatus and to a combined fishing rod and bait casting apparatus.

As is well known to those skilled in the art, equipment utilized by fishermen who fish mainly for recreational purposes, is the usual rod containing a reel and a line, one end of the line being attached to the reel and the other end being provided with a hook which is attached to the bait.

In my copending application, Serial No. 269,222, filed on April 21, 1939, an improved apparatus for casting bait has been described, in which the bait attached to a line is cast with considerable force into a body of water, such as a lake or stream, from whence it may be reeled inwardly toward the operator. One of the principal advantages of apparatus of this type resides in the fact that the bait may be cast equally as well by the novice as by those who are adept in the casting art.

One of the objects of the present invention is to provide an improved apparatus for casting bait which is simple in form and positive in action.

Another object of my invention is to provide an improved bait casting apparatus which forms part of a fishing rod.

A further object of my invention is to provide a combined fishing rod and bait casting apparatus by means of which the bait having a fishing line attached thereto may be cast to the desired distance into a body of water, whereupon the rod may be utilized in the usual manner for fishing purposes.

Other objects and advantages of my invention will be apparent as the specification proceeds.

My invention will be better understood by reference to the accompanying drawing, in which:

Fig. 1 is a view, partly in side elevation and partly in section, of my improved apparatus, parts being broken away and the tubular members being shown in extended position;

Fig. 2 is a longitudinal sectional view of a portion of the apparatus shown in Fig. 1, with parts shown in elevation and the tubular members being shown in nested position;

Fig. 3 is an enlarged fragmentary view showing the handle portion of the rod in elevation with parts broken away to show the underlying structure;

Fig. 4 is a sectional view on the line 4—4 of Fig. 3, showing a plan view of the underlying structure;

Fig. 5 is a fragmentary sectional view of the line 5—5 in Fig. 4 showing an elevational view of adjacent structure; and Fig. 6 is a plan view on the line 6—6 of Fig. 2.

As shown more particularly in Figs. 1 and 2 of the drawing, my improved apparatus may be utilized as a bait casting apparatus alone, but is preferably in the form of a rod in which the bait casting apparatus constitutes part of the fishing rod. According to my invention a plurality of tubular members 1, 2 and 3 are provided, which are telescopically connected together and which are normally adapted to be maintained in extended position by any suitable means, such as pressure actuated means. Associated with the tubular members is a movable container 4 which is adapted to be moved against the force of the pressure actuated means and which serves as a holder for bait attached to the end of a fishing line 5a, the other end of the fishing line being attached to the reel 6. Upon release of the container the pressure actuated means propels container 4 with sufficient force to cast the bait therefrom into a body of water. While as illustrated in the drawing only three tubular members are shown, it will be understood that only two may be provided or the number may be greater than three.

As shown in Figs. 1 and 2 of the drawing, the tubular member 1 is attached to casing 5 by any suitable means, such as welding, and its opposite end is attached in a similar manner to a housing 7 for purposes to be subsequently described. Arranged within tubular member 1 is a piston 8 provided with a threaded slot to which is attached one end of tubular member 2, the other end of tubular member 2 being turned inwardly into engagement with one portion of the tubular member 3. Tubular member 2 is also provided with a piston 9 slidably mounted therein, which is also provided with a threaded slot to removably receive one end of the tubular member 3, the other end of tubular member 3 being turned inwardly to engage a rod 10, one end of said rod being attached to container 4 and the other end being removably attached to piston 14.

According to my invention means are provided to normally maintain the tubular members in extended position. While any suitable means may be provided for this purpose, such as fluid pressure which may be supplied to the tubular members from a suitable liquid or gas source maintained under pressure, or from air expelled from blank cartridges or from other sources, as illustrated the tubular members are extended by resilient means, such as compression springs 11, 12 and 13, mounted interiorly of tubes 1, 2 and 3. As shown one end of compression spring 11 bears against one end of casing 5 and the other end bears against piston 8. In a like manner one end of compression spring 12 within tubular member 2 bears against one side of piston 8 and the other end bears against one side of piston 9, and in tubular member 3 one end of compression spring 13 bears against piston 9 and the other end bears against piston 14.

For the purpose of compressing springs 11, 12 and 13 to provide a force for casting bait from container 4, means are provided to draw the tubular members into nested relationship against the resilient action of the springs. For this purpose one end of a rod 15 is attached to piston 14, the other end being extended through an aperture in piston 9 and has connected thereto a flexible member, such as a cord or wire 16, which passes through apertures in piston 8 and casing 5 and is adapted to be wound around a spool, the shaft 17 of which is pivotally mounted in casing 5. Flexible member 16 may be wound upon shaft 17 by any suitable means, such as by a handle 18 connected to a gear 19 which meshes with a pinion 20 affixed to one end of shaft 17.

To retain container 4 in a position for holding the tubular members in nested position, the rod 15 is provided with a knob 21 which is engaged by a hook 22 affixed to a shaft 23 pivotally mounted in casing 5. As shown the shaft 23 is urged by a spring 24 in a direction to maintain the hook in engagement with the knob 21. As the flexible member 16 is wound upon a shaft 17, means are also provided to prevent springs 11, 12 and 13 from accidentally extending the tubular members. For this purpose shaft 23 is provided with an arm 25 which is attached to one end of a pawl 26 by any suitable means, such as a bolt or pin 27. The pawl 26 is pivotally mounted on a pintle or shaft 28 and its free end normally engages a ratchet 29 mounted upon the shaft 17. Spring 24, therefore, also tends to maintain pawl 26 in engagement with ratchet 29, which prevents accidental extension of the tubular members.

As illustrated, means are provided for raising hook 22 and pawl 26 when it is desired to cast the bait in the desired body of water. While any suitable means may be utilized for this purpose, as shown a pressure actuated button 30 is provided which may be prevented from accidental displacement by means of a bifurcated lug 31 slidably mounted on top of casing 5 and the opposite sides of which are adapted to engage the shank 32 of button 30. Upon sliding bifurcated member 31 away from the shank 32, however, button 30 may be pressed downwardly to release hook 22 and pawl 26. For this purpose the shank 32 of button 30 is attached to one end of an arm 33, the opposite end of said arm being attached to shaft 23, and when button 30 is pressed downwardly shaft 23 is rotated in a counterclockwise direction as shown in Fig. 3, which raises hook 22 and pawl 26 against the action of spring 24. The pressure actuated means is thus released and the tubes are rapidly extended, throwing container 4 forward with sufficient rapidity to cast the bait therefrom.

For the purpose of retaining the bait in container 4 when the tubular members are in nested position as shown in Fig. 2, a housing 7 is provided which as shown is attached to one end of tubular member 1. This housing is provided with a cover 35 which if desired may be provided with a spring catch 36 for normally retaining it in closed position. When container 4, however, is forced outwardly by the compressed springs 35 is opened against the action of the spring clip and swings backwardly upon the top of housing 34. If desired, resilient means such as a spring 36a, as shown in Fig. 6, may be provided to aid this action, although such spring means are not required. If desired, the catch 36 may also be omitted as the cover 35 will be normally maintained in closed position by gravity.

Means are also provided for absorbing the shock incident to the sudden extension of the tubular means. While any suitable shock-absorbing means may be utilized, such as the usual dash-pot arrangement, as illustrated in the drawing resilient means 37 is provided in tubular member 1 between piston 8 and housing 7, resilient means 40 is provided in tubular member 2 between piston 9 and the inturned end of the tubular member, and resilient means 41 is provided in tubular member 3 between piston 14 and the inturned end of that tubular member.

The reel 6 may be attached to casing 5 or to one of the tubular members. For convenience it is preferably attached to tubular member 1 as illustrated in Fig. 2 of the drawing, and tubular member 1 and housing 7 are provided with hooks 38 to receive the line 5a. Cushioning means, such as rubber gaskets 39 are also preferably provided between pistons 8, 9 and 14 and resilient members 37, 40 and 41 to minimize wear upon the springs and pistons and to reduce the noise incident to the extension of the tubular members.

As previously stated, the apparatus is arranged so that it may be readily assembled and taken apart. For this purpose the rod 10 is removably threaded to piston 14 and may be removed from tubular member 3. In like manner tubular member 3 is threaded to piston 9 and tubular member 2 is threaded to piston 8, so that these members may be removed from each other. The apparatus may therefore be easily transported and assembled for use.

My improved rod may be held in the hand or may be supported by any suitable means. As shown in Fig. 1, a support 42 is provided for this purpose, which if desired may be mounted upon a suitable fixture such as a boat or wharf, in a manner shown in my copending application to which reference has been made.

What I claim is:

1. Apparatus of the class described comprising a container for bait, a plurality of telescopically arranged tubular members, pressure actuated means for normally maintaining said members in extended position, a housing associated with one of said members, means whereby said container may be moved against the action of said pressure actuated means to move the remaining tubular members into nesting relationship and said container into said housing, a cover for said housing, said pressure actuated means being adapted upon release of said container to move said container with sufficient rapidity to open the cover on said housing and cast the bait from said container.

2. Apparatus of the class described comprising a plurality of telescopically arranged tubular members of varying diameter, a piston arranged in each tubular member to which is attached the tubular member of the next smaller diameter, means for applying pressure to each piston for normally extending said members, a container for bait attached to the piston of the tubular member having the smallest diameter, and means for moving said container against the end of the tubular member having the smallest diameter to force said members into nesting relationship and to increase the pressure upon said pistons, said pressure actuated means being adapted upon release of said container to rapidly extend the tubular members and cast the bait from said container.

3. Apparatus of the class described comprising a plurality of telescopically arranged tubular members of varying diameter, a piston arranged in each tubular member to which is removably attached one end of the adjacent tubular member, a movable container for bait having one end of a rod attached thereto, the other end of said rod being attached to the piston for the tubular member having the smallest diameter and pressure actuated means for forcing said tubular members to extended position, said container being adapted to be moved to force said tubular members into nesting position against the force of said pressure actuated means.

4. Apparatus of the class described comprising a plurality of telescopically arranged tubular members of varying diameter, pressure actuated means for normally maintaining said members in extended position, a container for bait associated with the tubular member having the smallest diameter, said container being associated with said tubular member in such a manner that upon movement of the container in one direction the tubular members are moved into nesting position against the force of said pressure actuated means, means for retaining the container in a position to maintain the tubular members in nesting relationship, and means adapted to be actuated for releasing said container.

5. Apparatus of the class described comprising a plurality of telescopically arranged tubular members of varying diameter, pressure actuated means for normally maintaining said members in extended position, a container for bait associated with said members, a rod connected to one end of said container, a flexible member associated with the opposite end of said rod, a casing associated with the tubular member having the greatest diameter, a reel for the flexible member arranged in said casing, means whereby the flexible member may be wound on said reel to draw said container into contact with some of said tubular members against the force of said pressure actuated means, means arranged in said casing for retaining the container in a position to hold said tubular members in nesting position and means for releasing said retaining means whereupon said pressure actuated means rapidly moves said members to extended position and forces said container away from the tubular members with sufficient rapidity to cast the bait therefrom.

6. Apparatus of the class described comprising a rod including a plurality of telescopically arranged tubular members, a container for bait, said container being adapted upon movement in one direction to engage and move said tubular members into nesting position, a reel attached to said rod having a fishing line adapted to be wound thereon, one end of said fishing line extending into said container and being attached to said bait and means effective upon the release of said container for rapidly extending said tubular members and moving said container with sufficient rapidity to cast the bait therefrom.

7. Apparatus of the class described comprising a rod including a plurality of telescopically arranged tubular members, a container for bait, pressure actuated means for normally maintaining said tubular members in extended position, said container being adapted upon movement in one direction to engage and move said tubular members into nesting engagement against the force of said pressure actuated means, a reel attached to said rod having a fishing line adapted to be wound thereon, one end of said fishing line extending into said container and being attached to said bait, and said pressure actuated means being effective upon release of said container to force said tubular members into extended position and to move the container with sufficient rapidity to cast the bait therefrom.

8. Apparatus of the class described comprising a plurality of telescopically arranged tubular members, means for normally maintaining said tubular members in extended position, a movable container for bait having an end portion, means for normally maintaining said container beyond said tubular members, means whereby the end portion of said container may be moved into engagement with said tubular members and the tubular members forced into nesting engagement with each other by the movement of said container, the means for maintaining said tubular member in extended position and the means for maintaining the container beyond the tubular members being effective in forcing said container rapidly in the opposite direction when said container is released.

9. Apparatus of the class described comprising a plurality of telescopically arranged tubular members, means for normally maintaining said tubular members in extended position, a movable container for bait having an end portion, means for normally maintaining said container beyond said tubular members, means whereby the end portion of said container may be moved into engagement with said tubular members and the tubular members forced into nesting engagement with each other by the movement of said container, means for retaining the container in a position to maintain the tubular members in nested relationship, and means whereby said container may be released, the means for normally maintaining said members in extended position and the means for normally maintaining the container beyond the tubular members being effective upon release of said container to move the container in the opposite direction with sufficient rapidity to cast the bait therefrom.

10. Apparatus of the class described comprising a plurality of telescopically arranged tubular members, pressure actuated means for normally maintaining said tubular members in extended position, a movable container for bait having an end portion, pressure actuated means for normally maintaining said container beyond said tubular members, means whereby the end portion of said container may be moved into engagement with said tubular members and the tubular members forced into nesting engagement with each other by the movement of said container, and means for retaining the container in a position to maintain the tubular members in nested relationship, the pressure actuated means for normally maintaining the tubular members in extended position and the means for maintaining the container beyond the tubular members being effective upon release of said container to move the container in the opposite direction with sufficient rapidity to cast the bait therefrom.

SIDNEY M. ROWE.